July 7, 1953 J. L. PETTUS 2,644,562
FILM SPROCKET CLUTCH
Filed Feb. 16, 1951

INVENTOR.
JAMES L. PETTUS
BY
ATTORNEY

Patented July 7, 1953

2,644,562

UNITED STATES PATENT OFFICE 2,644,562

FILM SPROCKET CLUTCH

James L. Pettus, Encino, Calif., assignor to Radio Corporation of America, a corporation of Delaware Application February 16, 1951, Serial No. 211,265

6 Claims. (Cl. 192—67)

This invention relates to motion picture equipment, and particularly to a clutch for a sprocket for advancing film through motion picture equipment such as recorders and reproducers.

It is well-known, in motion picture production, that the picture is photographed on one film and the sound is recorded on another, both films being advanced in synchronism. In such systems, the motor drive is generally of the self-synchronous type, wherein one phase is energized to lock all the motors at a certain position, and then the other phases simultaneously energized to advance the films. However, it is desirable at times, after the motors are interlocked, to advance one of the films in either direction a frame or part of a frame in order to more accurately adjust either film loop or to better position the synchronization point. The present invention permits such an advancement or adjustment, while the motor, and consequently, the drive shaft for the sprocket are locked in position.

The present invention, therefore, is directed to a "free wheeling" film sprocket or a sprocket clutch whereby the sprocket may be quickly released from its drive shaft and rotated to another point on the drive shaft. The clutch has a plurality of opposing radial serrations, the number of serrations determining the minimum angle of adjustment. If a sprocket has thirty-two teeth, the adjustment angle may be made one-thirty-second of 360 degrees so as to permit rotation of the sprocket on the drive shaft one sprocket tooth or film perforation pitch.

The principal object of the invention, therefore, is to facilitate the positioning of film on a sprocket independently of the drive shaft of the sprocket.

Another object of the invention is to provide a "free wheeling" sprocket for film.

A further object of the invention is to provide an improved clutch for a sprocket to permit said sprocket to be quickly and easily rotatable on its drive shaft in small increments.

Although the novel features which are believed to be characteristic of this invention will be pointed out with particularity in the appended claims, the manner of its organization and the mode of its operation will be better understood by referring to the following description, read in conjunction with the accompanying drawings, forming a part hereof, in which:

Figure 1:
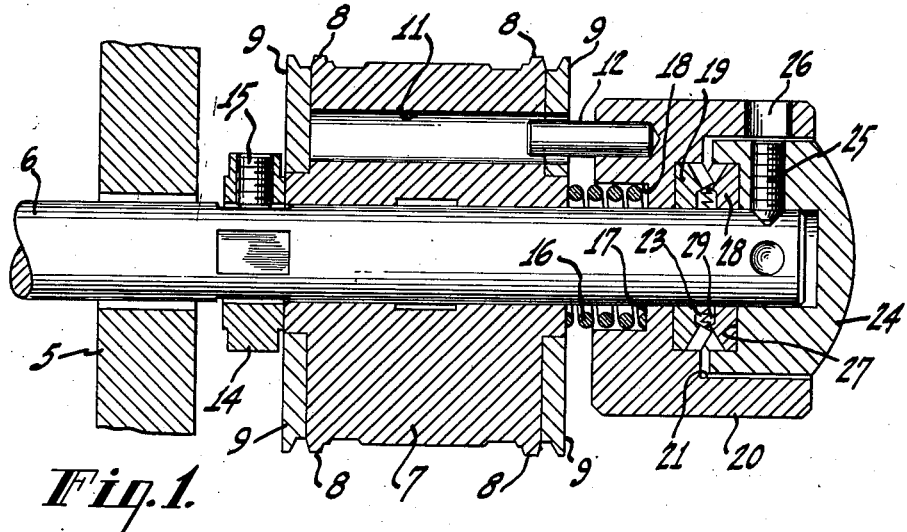
Fig. 1 is a cross-sectional view of a sprocket embodying the invention.
Figure 2:
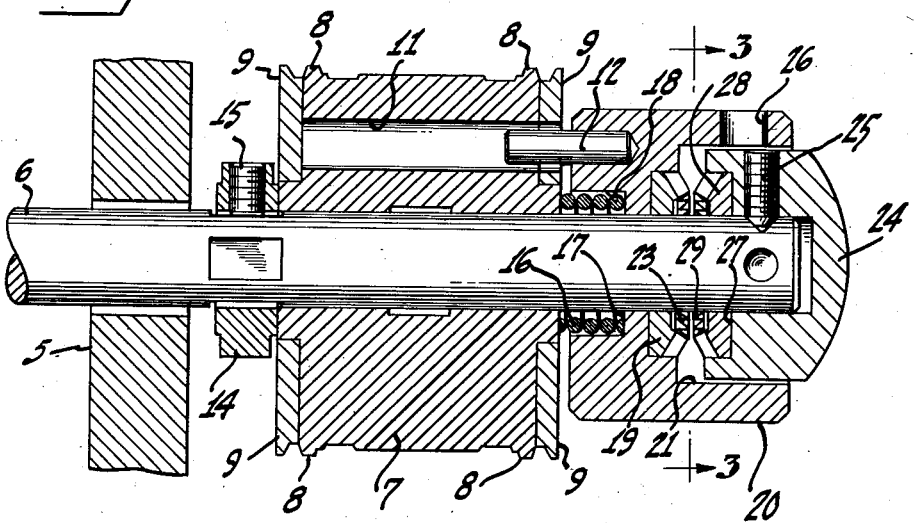
Fig. 2 is a cross-sectional view of the sprocket of the invention showing it in its position when it may be adjusted on its shaft.
Figure 3:
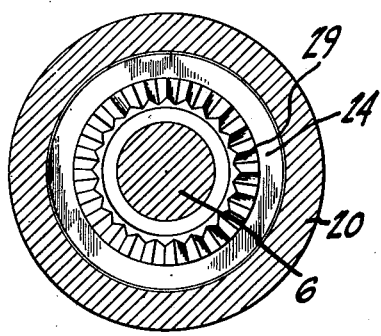
Fig. 3 is a cross-sectional view taken along the line 3—3 of Fig. 2.

Referring now to the drawings, in which the same numerals identify like elements, a recorder or reproducer panel 5 has passing therethrough a sprocket drive shaft 6 and on which is mounted a film drive sprocket 7 having teeth 8 and edge guiding flanges 9. Through the sprocket 7 and flange 9, is an opening or hole 11 in which a drive pin 12 is positioned.

The sprocket is maintained in a certain axial position on shaft 6 by a collar 14 held by a set screw 15 and by the tension of a spring 16 abutting the other end of the sprocket and the end surface 17 of a concentric recess 18 in a cylindrical spinner 20. Although the sprocket 7 is held in axial position in the manner just described, it is free to rotate on the shaft 6. The spinner 20 is also provided with a concentric recess 21 opposite the recess 18 and in which is an insert plate 19 on which is a series of radial serrations 23. As mentioned above, the number of these serrations determines the fineness of the adjustment and a practical number is when they correspond to the number of teeth 8 on the sprocket 7. For instance, a thirty-two-toothed sprocket would have thirty-two serrations which would permit rotation of the sprocket in increments of one tooth or one film perforation pitch.

Within the recess 21, is positioned a knob 24 which is fixedly attached to the shaft 6 by a set screw 25, the set screw being accessible through a hole 26 in the spinner 20. Mounted in a recess 27 of the knob 24 is an insert plate 28 on the face of which is another series of serrations 29, which are adapted to dovetail or interlace with the serrations 23 on the spinner 20.

The sprocket 7 is, therefore, driven by the shaft 6 when the spring 16 moves the spinner 20 to the right to cause engagement of the serrations 23 and 29. The sprocket is connected to the spinner 20 through pin 12, the spinner being driven through the serrations. However, when the spinner 20 is grasped and moved to the left, the serrations will be disengaged and the sprocket may be turned any desired amount. In this manner, adjustment of the sprocket with respect to its drive shaft 6 may be quickly made whenever it is desired to advance a film thereon one or more sprocket teeth or perforations. The outer cylindrical surface of the spinner may be knurled to permit an operator to obtain a better grasp thereon.

I claim:

1. An adjustable film driving sprocket comprising a drive shaft, a sprocket rotatable on said shaft, a spinner element, a pin mounted on said spinner element and passing into an opening in said sprocket, a hub fixedly attached to said shaft and adjacent said spinner element, two sets of opposing serrations, one set being on said spinner, and the other set being on said hub, and a spring adapted to normally maintain said serrations in engagement, said serrations being disengaged by movement of said spinner element against the compression of said spring.

2. An adjustable film sprocket comprising a shaft, a sprocket rotatable on said shaft, means fixedly attached to said shaft and rotatable therewith, an intermediate element between said last mentioned means and said sprocket and connected to said sprocket, said element being movable axially toward and away from said sprocket, and means on said first mentioned means and on said element for engaging said first mentioned means with said element to rotate said sprocket with said shaft, movement of said element in one direction disengaging said last mentioned means to permit rotation of said sprocket on said shaft.

3. An adjustable film sprocket in accordance with claim 2, in which a pin is provided on said element for connecting said element to said sprocket, said pin being fixedly attached to said last element and movable into an opening in said sprocket.

4. An adjustable film sprocket in accordance with claim 2, in which said engaging means are a series of opposing radial serrations adapted to be engaged and disengaged and having a number equal to the number of the teeth on said sprocket.

5. An adjustable film sprocket in accordance with claim 2, in which a spring is provided intermediate said sprocket and said last mentioned means for maintaining said engaging means in engagement.

6. A sprocket clutch comprising a shaft, a sprocket rotatable on said shaft, a cylindrical spinner at one end of said sprocket axially movable and rotatable on said shaft, said spinner having a cylindrical concentric recess at each end thereof, a spring in one recess and abutting the adjacent end of said sprocket, a pin in said spinner and longitudinally movable in a hole in said sprocket, a hub in the other of said recesses, said hub being fixed on said shaft, and opposing serrations connected to said spinner and hub, said serrations being normally in engagement under tension of said spring.

JAMES L. PETTUS.

References Cited in the file of this patent

UNITED STATES PATENTS

| Number | Name | Date |
|---|---|---|
| 1,287,504 | Stechbart | Dec. 10, 1918 |
| 2,308,055 | Cogsdill | Jan. 12, 1943 |
| 2,359,859 | Jarvis | Oct. 10, 1944 |